Patented July 2, 1946

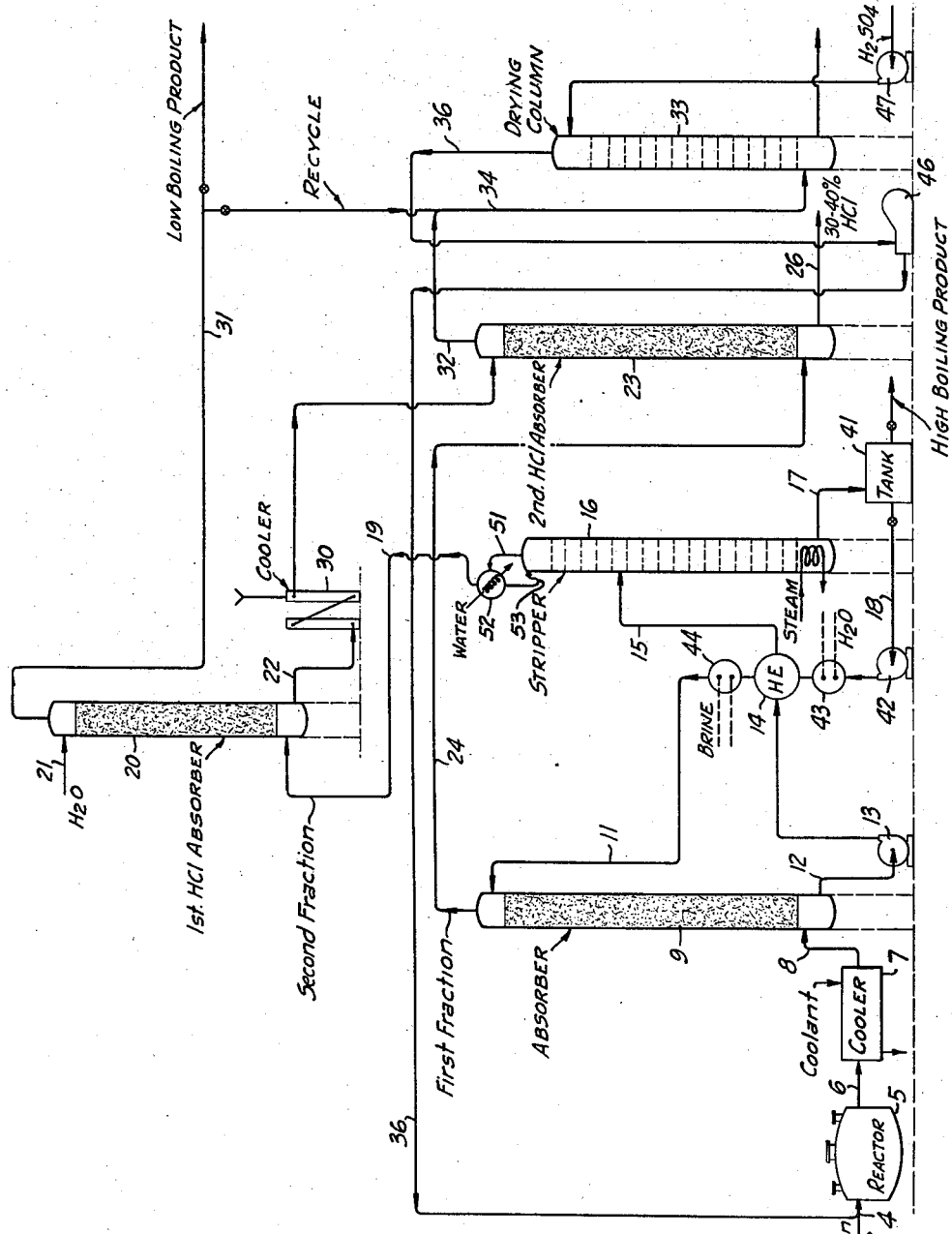

2,402,978

UNITED STATES PATENT OFFICE 2,402,978

PROCESS FOR CHLORINATION OF SATURATED HYDROCARBONS AND RECOVERING HYDROCHLORIC ACID

Glenn L. Allen, Jr., Freeport, Tex., and Robert Heitz, Antioch, and George Henderson, Pittsburg, Calif., assignors to The Dow Chemical Company, Midland, Mich., a corporation of Michigan Application May 5, 1944, Serial No. 534,374

5 Claims. (Cl. 23—154)

This invention relates to the separation of hydrogen chloride from gaseous mixtures containing chlorinated hydrocarbons which result from the chlorination of methane and ethane, and to the recovery from such mixtures of the hydrogen chloride as hydrochloric acid of an acceptable commercial strength and purity free of chlorine and chlorinated hydrocarbons.

The substitution chlorination of methane and ethane results in the replacement by chlorine of one or more hydrogen atoms in the hydrocarbon molecule with the formation of a corresponding amount of hydrogen chloride. For example, when methane is completely chlorinated, each mol of carbon tetrachloride produced is accompanied by four mols of hydrogen chloride. It has been the practice heretofore to separate and to recover the chlorinated products and hydrogen chloride by various methods. For example, in Patent No. 1,422,838, the exit gases from the chlorination operation are first cooled in a water-cooled condenser to condense heavier reaction products. The gas remaining is then compressed and led through a heat exchanger into a liquefaction and rectification tower of the Linde type wherein substantially all of the substances present, with the exception of methane and nitrogen, are condensed as a liquid mixture. The liquid mixture is then subjected to further rectification. The apparatus required for this procedure is very complicated, expensive, difficult to control and costly to operate and to maintain. Further, it is not readily adaptable to production of various chlorinated hydrocarbons.

In Patent No. 1,831,474, it is proposed to remove the hydrogen chloride present by direct absorption in water. Because it is essential that hydrogen chloride be completely removed, it is necessary to use comparatively large volumes of water or cool the acid externally during the absorption. In the first case, the concentration of the hydrochloric acid issuing from the operation is so low that the acid must be fortified with hydrogen chloride or with strong acid; in the second case, the acid produced will contain so much chlorinated hydrocarbons that the acid cannot be handled in any equipment wherein it comes into contact with rubber. For example, this prevents the acid from being handled in rubber lined tank cars, the usual transportation medium. Further, the acid containing chlorinated hydrocarbons is not ordinarily saleable. An even more serious objection to this operation in either case is that the recovered acid will contain so large a quantity of chlorine, dissolved when the water is brought into contact with the chlorine-hydrogen chloride mixture, that it must be further processed to be saleable.

In Patent No. 1,421,733, it is proposed that the exit gases from the chlorination operation be first washed with a solvent for halogenated compounds present, after which the gases remaining are washed with water in another tower to remove hydrogen chloride as hydrochloric acid. This operation also produces hydrochloric acid containing too large a quantity of chlorine. This process can be used with some success if only chlorinated hydrocarbons of relatively high boiling point are to be recovered.

A further difficulty arises when, as is often the case, several products having widely different boiling points result from the chlorination operation. For example, in the chlorination of methane, all four chloromethanes are usually formed in the chlorination operation. Depending upon the operation and the purity of the methane originally treated, this number may even be higher; thus if ethane is present, various chlorinated ethanes may be produced, together with hexachlorobenzene and perchloroethylene.

The process of this invention enables methane chlorination products to be easily and quickly separated into two fractions, one containing those materials boiling at a relatively low temperature such as methyl chloride and hydrochloric acid, and another, containing mainly those chlorinated materials boiling at temperatures above usual cooling water temperatures. In this way, the operation can be materially simplified while the equipment required can be simplified very materially.

This invention will be described particularly as it is applied to the treatment of products from methane chlorination. However, the invention is not limited to these, for it is applicable to the handling of hydrocarbon products resulting from the substitution chlorination of other aliphatic hydrocarbons, particularly ethane, or mixtures of hydrocarbons containing ethane or methane, and to products from the reaction of chlorine and hydrocarbons yielding substantial amounts of HCl and organic products boiling below about 15° C., both of which are to be recovered. The value of the invention must be emphasized as it applies to separation of chlorinated hydrocarbons having boiling points below about 15° C., such as methyl chloride or ethyl chloride, for these cannot be separated from chlorine and hydrogen chloride in usual distillation equipment.

In general, the broad object of this invention is to provide a process for separation and recovery of hydrochloric acid from chlorinated hydrocarbon vapors, particularly those which contain one or more chlorinated hydrocarbons boiling below ordinary cooling water temperature and which are usually not separable from chlorine and hydrogen chloride without the use of compressors and brine-cooled condensers.

Another object of the invention is to provide a process for separating a gaseous mixture of chlorinated hydrocarbons and hydrogen chloride, by simple steps and in simple equipment, into a fraction containing chlorinated hydrocarbons boiling below about 15° C., a fraction of chlorinated hydrocarbons of higher boiling point, and hydrochloric acid of usable commercial strength and purity.

The invention is further illustrated by the following operation set forth only by way of example and as illustrative of how the invention can be successfully practiced upon a mixture of chlorinated hydrocarbons and hydrogen chloride resulting from the chlorination of methane. In the drawing, the single figure is a flow sheet illustrating a suitable diagrammatic apparatus assembly and the flow of the various components.

Referring to the drawing, chlorine and methane are first reacted to form one or more chloro methanes and hydrogen chloride. This mixture may also contain unreacted methane and some unreacted chlorine. The reaction can be carried on in any known manner, for example in accordance with Bender Patents 2,170,801, of August 29, 1939, 2,200,254 and 2,200,255, of May 14, 1940, or in any other suitable manner. In the apparatus in the drawing the reaction is shown as conducted in a reactor 5, methane, chlorine and recycle gas being introduced through line 4; a series of reactors can be employed for the reaction can be carried on in any desired manner.

The reaction mixture, containing one or more chloromethanes and hydrogen chloride, is introduced through line 6 into cooler 7. The reaction mixture, after being cooled to about 20°–50° C., is introduced into the bottom of absorber 9 through line 8. A stream of non-aqueous, solvent liquid, introduced at the top of absorber 9 from line 11, descends in the absorber and scrubs out of the ascending gas stream the high boiling chlorinated methanes, particularly carbon tetrachloride and chloroform and some hydrogen chloride. Cooling of the reaction mixture is not necessary, for the solvent liquid can be cooled and utilized as the coolant if this is deemed more desirable than utilization of cooler 7.

To provide the solvent liquid stream, one can use any suitable material; in the case of methane, a mixture of the chlorinated hydrocarbons is conveniently employed, such as a mixture of chloroform and carbon tetrachloride. From the bottom of the absorber, the enriched solvent stream is removed through line 12 and forced by pump 13 to pass through a heat exchange 14. Line 15 carries the enriched stream from the heat exchange to the top of a stripping column 16. The stripping column is heated to a temperature sufficient to boil off hydrogen chloride and other low boiling materials such as methyl or ethyl chloride carried in the enriched solvent stream from absorber 9. The liquid stream issuing from the base of the stripper is removed through line 17 into tank 41 as the high boiling fraction. Some of this is returned through line 18 to pump 42 which forces it on through water cooled condenser 43, heat exchanger 14 and brine cooled condenser 44 to absorber 9 through line 11. If the chlorination operation is so conducted that formation of chloroform and carbon tetrachloride does not occur, the entire solvent stream is returned through line 18.

The hydrogen chloride and chlorinated hydrocarbon gas stream issuing from the top of the stripper 16 is taken off through line 51 and is passed through a condenser 52, liquid forming in the condenser being returned to the top of the column 16 through line 53. The gas stream is conducted by line 19 to the bottom of an absorber 20 wherein it is brought into contact with a descending stream of water introduced into the absorber 20 from line 21 to form a weak hydrochloric acid. This acid stream is drawn off through line 22 and is introduced into a cooler 30 and then into the top of a second hydrogen chloride absorber 23 wherein it is brought into contact with more hydrogen chloride from the absorber 9. This is usually high in hydrogen chloride; it is introduced into the bottom of the second hydrogen chloride absorber 23 through line 24.

The quantity of water introduced through line 21 into the first absorber is such that the hydrochloric acid finally drawn off from the bottom of the second hydrogen chloride absorber 23 through line 26 is of commercial strength, usually between 30% and 40% hydrogen chloride. The unabsorbed fraction containing the low boiling RCl's is taken off at the top of absorber 20 through line 31 to be further purified for sale or to be returned through line 34 for recycling.

Preferably, reactor 5 is operated to provide an exit gas containing very little if any chlorine. In fact, several reactors can be employed in series, one or more of these serving to react a minor chlorine quantity and eliminate it.

The second absorber 23 is operated at a temperature which is sufficient to boil off any chlorinated hydrocarbons and chlorine. The methane in the rich hydrogen chloride stream from absorber 9 sweeps these out, but air or a fixed gas can be used as a sweeping gas. To enable the temperature in the absorber 23 to be controlled, a cooler 30 is placed in line 22. This cooler is employed to insure that the gas issuing from the second absorber through line 32 is cold; this reduces the load on dryer 23. Gas issuing from the second absorber 23 through line 32 is usually largely methane, some higher chlorinated methanes being present; this gas is burned or recycled; in case it is returned, it is dried in tower 33 from which it is returned by pump 46 and line 36 to the reaction zone in reactor 5. Pump 47 delivers a stream of sulphuric acid through line 48 to the tower 33. As typical and as a specific operation, the following example is set forth to explain further detailed practice of the invention:

A gas stream from reactor 5 was introduced into the absorber 9 at the rate of 92.58 pound mols per hour. It was of the following composition:

| | Pound mols per hour |
|---|---|
| CH$_4$ and N$_2$ | 28.42 |
| Cl$_2$ | 0.22 |
| HCl | 44.70 |
| CH$_3$Cl and CH$_2$Cl$_2$ | 10.21 |
| CHCl$_3$ | 5.79 |
| CCl$_4$ | 1.55 |
| RCl | 1.69 |

A steam of solvent was introduced into absorber 9 at the rate of 40 g. p. m. The solvent was of the following composition:

| | Pound mols per hour |
|---|---|
| $CH_2Cl_2$ | 0.42 |
| $CHCl_3$ | 2.99 |
| $CCl_4$ | 1.45 |

The solvent removed such constituents that the gas passing through line 24 (the first fraction) was of the following composition:

| | Pound mols per hour |
|---|---|
| $CH_4$ and $N_2$ | 28.10 |
| RCl (mixture approx. $CHCl_3$ mol. wt.) | 1.69 |
| HCl | 37.90 |

It is to be noted that the chlorinated hydrocarbon fraction, indicated by RCl, is quite small; this shows the extent of removal of these and creation of a gas strong in hydrogen chloride for use in the second hydrogen chloride absorber 23. The product drawn off through line 17 was of the same composition as that in line 18. The gases issuing from stripper 16 through line 19 (the second fraction) had the following composition:

| | Pound mols per hour |
|---|---|
| $Cl_2$ | 0.22 |
| HCl | 6.80 |
| $CH_4$ | 0.32 |
| $CH_3Cl$ and $CH_2Cl_2$ | 9.79 |
| $CHCl_3$ | 2.80 |
| $CCl_4$ | 0.10 |

In the first absorber 20, only the hydrogen chloride was removed by solution in the water; the water quantity admitted to the absorber 20 was so regulated as to provide a 32% acid from the second absorber. The strong hydrogen chloride stream from line 24 brought the weak acid stream admitted to the second absorber 23 up to the desired strength.

The gas stream released by absorber 20 through line 31 is practically free of HCl and carries practically all of the chlorinated hydrocarbons boiling below 15° C. It is a feature of this invention that a gas of this composition can be (1) separated from higher boiling hydrocarbons and HCl (2) without utilization of high pressures and low temperatures (3) together with production of a commercially saleable hydrochloric acid. Any methane and light chlorinated materials are boiled off in absorber 23 and returned through line 32. The gases in line 34 are conducted to drying column 33 wherein they are dried with sulphuric acid. After drying with sulphuric acid in drying column 33, the gases are returned through line 36 to the reactor 7. In the case under discussion, 5347 pounds of 32% hydrochloric acid per hour were removed through line 26.

Those skilled in chemical engineering will readily appreciate the value of the specific devices which can be used in carrying out the process of this invention, as well as how readily the process can be used to good advantage on other chlorinated hydrocarbon mixtures containing hydrogen chloride and having valuable components which cannot be readily separated from it in ordinary distillation equipment and without the employment of brine-cooled condensers and compressors.

We claim:

1. A process for separating a gaseous mixture of hydrogen chloride and at least one chloromethane from the group consisting of methyl chloride, dichloromethane, chloroform and carbon tetrachloride comprising scrubbing the mixture with a solvent to remove substantially all chloroform and carbon tetrachloride and provide as a first gas fraction a scrubbed gas stream containing hydrogen chloride, heating the solvent from the scrubbing step to drive off any methyl chloride and hydrogen chloride therein as a second gas fraction, then scrubbing the second gas fraction with water to remove the hydrogen chloride and form a weak hydrochloric acid, and scrubbing the first gas fraction with said weak acid to bring the acid up to a usuable commercial strength.

2. A process for separating a gaseous mixture of hydrogen chloride, methyl chloride, dichloromethane, chloroform and carbon tetrachloride comprising scrubbing the mixture with a solvent to remove substantially all chloroform and carbon tetrachloride and provide as a first gas fraction a scrubbed gas stream containing hydrogen chloride, heating the solvent from the scrubbing step to drive off any methyl chloride and hydrogen chloride as a second gas fraction, then scrubbing the second gas fraction with water to remove the hydrogen chloride and form a weak hydrochloric acid, and scrubbing the first gas fraction with the weak acid to bring the acid up to a usable commercial strength and remove methyl chloride carried over from the first water scrubbing.

3. A process for separating a mixture of hydrogen chloride, a first chlorinated hydrocarbon having a boiling point below about 15° C. and a second chlorinated hydrocarbon having a boiling point of about 15° C. into separate fractions comprising scrubbing the mixture with a solvent removing substantially all the hydrocarbons and provide a scrubbed vapor stream containing hydrogen chloride stream as a first gas fraction, heating the solvent from the scrubbing step to remove any hydrogen chloride and first chlorinated hydrocarbon therein and provide a second gas fraction and the second hydrocarbon as a separate fraction, then scrubbing said second gas fraction with water to remove substantially all hydrogen chloride therefrom and form dilute hydrochloric acid, scrubbing said first gas fraction with said dilute acid to remove the hydrogen chloride from said fraction and to remove from the hydrochloric acid any of the second hydrocarbon present.

4. In the chlorination of gaseous aliphatic hydrocarbons, the method of separating the components of the reaction mixture which comprises (1) scrubbing the gaseous reaction mixture with a liquid composed of chlorinated hydrocarbons formed in the reaction to condense and absorb the major portion of the chlorinated hydrocarbons in the gas, (2) heating the liquid from said scrubbing step to strip the same of absorbed gaseous components, (3) scrubbing the gases evolved from said stripping step with water to absorb hydrogen chloride therefrom and form a weak hydrochloric acid solution, (4) employing the weak hydrochloric acid solution from said third step to absorb hydrogen chloride from the uncondensed gases from said first step to form a strong hydrochloric acid solution and (5) returning a portion of the liquid chlorinated hydrocarbons from said second step for use as the scrubbing liquid in said first step.

5. In the chlorination of gaseous aliphatic hydrocarbons, the method of separating the components of the reaction mixture which comprises (1) scrubbing the gaseous reaction mixture with a liquid composed of chlorinated hydrocarbons formed in the reaction to condense and absorb the major portion of the chlorinated hydrocarbons in the gas, (2) heating the liquid from said scrubbing step to strip the same of absorbed gaseous components, (3) scrubbing the gases evolved from said stripping step with water to absorb hydrogen chloride therefrom and form a weak hydrochloric acid solution and (4) employing the weak hydrochloric acid solution from said third step to absorb hydrogen chloride from the uncondensed gases from said first step to form a strong hydrochloric acid solution.

GLENN L. ALLEN, JR.
ROBERT HEITZ.
GEORGE HENDERSON.